Nov. 2, 1948.  L. W. VEZIE  2,452,881
SAFETY VALVE COFFEE MAKER
Filed June 27, 1947
2 Sheets-Sheet 1
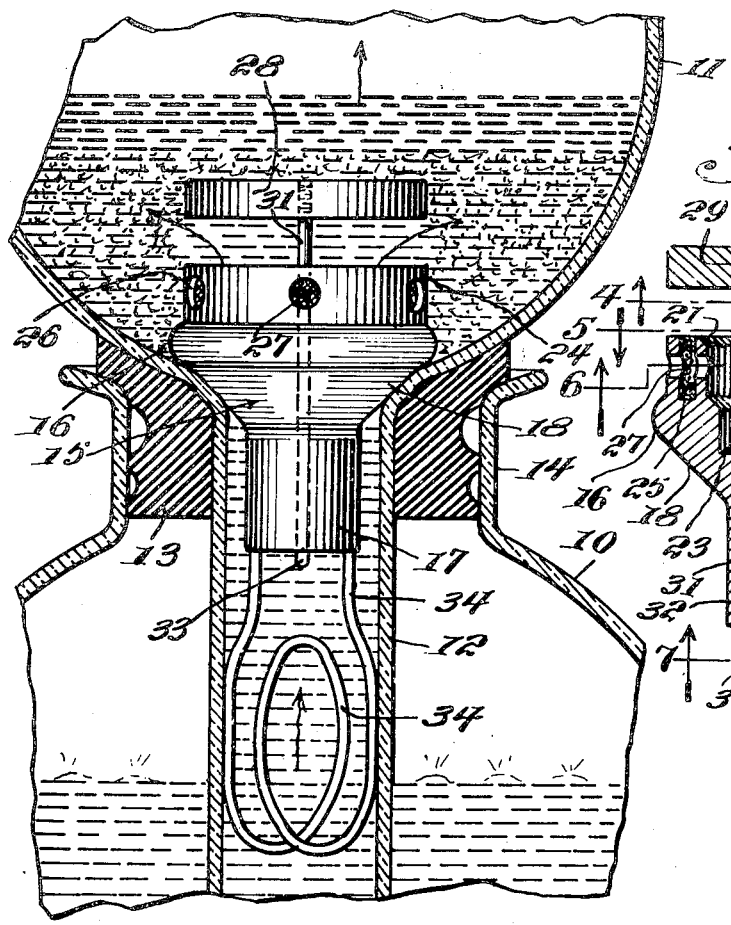
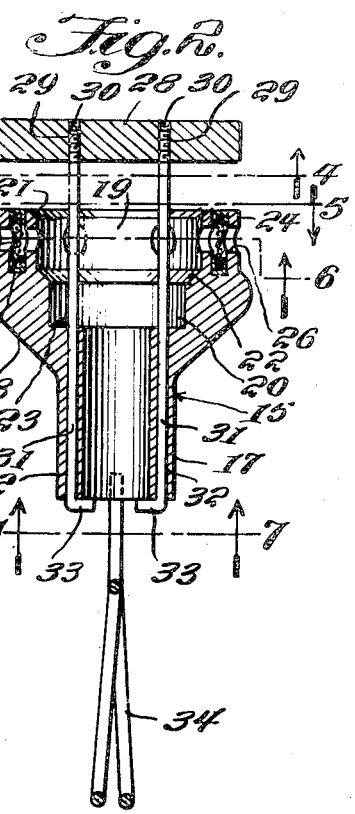
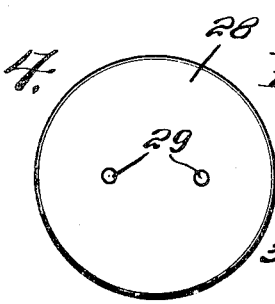
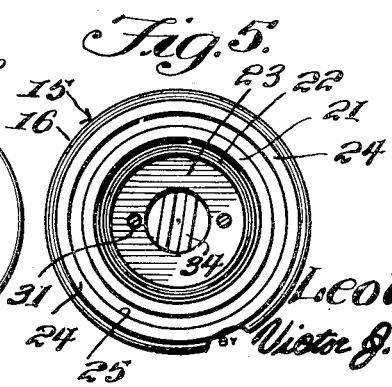
INVENTOR.
Leo W. Vezie,
Victor J. Evans & Co.
ATTORNEYS Nov. 2, 1948.  L. W. VEZIE  2,452,881
SAFETY VALVE COFFEE MAKER
Filed June 27, 1947  2 Sheets-Sheet 2
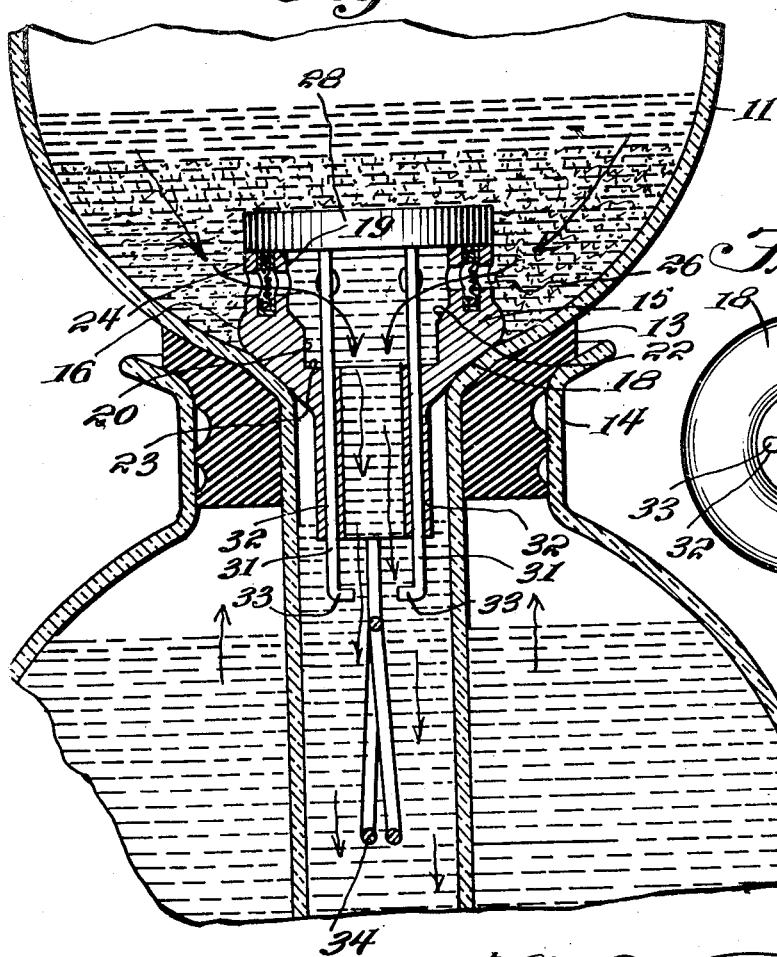
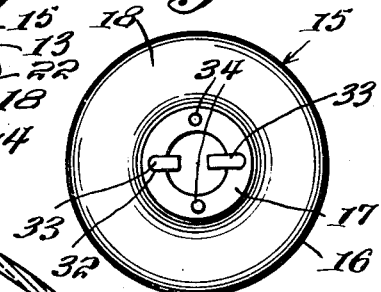
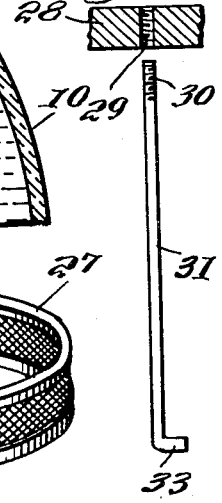
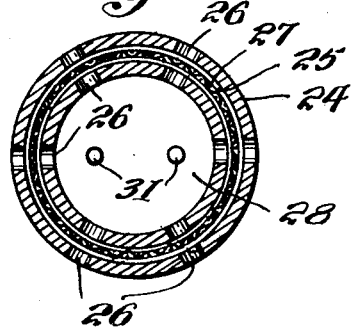
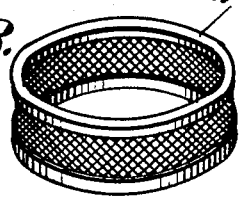
INVENTOR.
Leo W. Vezie,
by Victor J. Evans & Co.
ATTORNEYS Patented Nov. 2, 1948

2,452,881

UNITED STATES PATENT OFFICE 2,452,881

SAFETY VALVE COFFEE MAKER

Leo W. Vezie, Phoenix, Ariz.

Application June 27, 1947, Serial No. 757,519

4 Claims. (Cl. 210—162)

This invention relates to a safety valve for vacuum type coffee makers, which will fit all standard sizes of this type of coffee makers.

An object of the invention is to provide a safety valve of this type which will eliminate the possibility of the bottom of the coffee maker exploding when an excess steam pressure is generated in the bottom, and there is an insufficient outlet for the steam to escape therefrom.

Another object of the invention is to provide a safety valve of this type which is adapted to be inserted in the stem of the top or bowl of the coffee maker, and is provided with spring means to retain it in place in said stem.

With the above and other objects and advantages in view, the invention consists of the novel details of construction, arrangement and combination of parts more fully hereinafter described, claimed and illustrated in the accompanying drawings in which:

Figure 1 is a fragmentary sectional view of a coffee maker shown in elevation, an embodiment of the invention mounted therein;

Figure 2 is a vertical sectional view of the valve, per se;

Figure 3 is a view similar to Figure 1 with the valve shown partly in section and partly in elevation;

Figure 4 is a sectional view on the line 4—4 of Figure 2;

Figure 5 is a sectional view on the line 5—5 of Figure 2;

Figure 6 is a sectional view on the line 6—6 of Figure 2;

Figure 7 is a sectional view on the line 7—7 of Figure 2;

Figure 8 is a perspective view of the filtering screen of the valve and

Figure 9 is a view, partly in section and partly in elevation, showing the manner in which the valve rods are removably mounted in the valve.

Referring more in detail to the drawings, the numeral 10 designates a portion of the bottom of a coffee maker while the numeral 11 designates a portion of the top or bowl portion of a coffee maker. The tubular stem 12 of the bowl portion is mounted in the usual rubber gasket 13 mounted in the neck 14 of the bottom, in the conventional manner.

The invention contemplates a valve body 15 having an enlarged top portion 16 and a reduced bottom portion 17, said top portion having a tapered shoulder 18 of a contour to be snugly fitted in the bowl 11 at the mouth of the stem 12, and the bottom portion being of a size to be received in and spaced from the stem portion of said bowl.

The top portion 16 has an upper circular chamber 19 formed therein, which communicates with the stem 17 through the medium of the upper intermediate chamber 20. The open end of the chamber 19 is provided with the annular outwardly inclined valve seat 21, while the lower end of the chamber 19, where it communicates with the chamber 20, is provided with the inwardly inclined shoulder 22, and the lower end of the chamber 20, where it communicates with the stem, is provided with the horizontal shoulder 23.

A ring portion 24 formed on the top of the portion 16 is provided with a circular vertical slot 25 therein, and the ring is provided with transversely extending opening 26, which extends through the slot 25. The slot 25 is open at its top to receive the ring shaped screen filter element 27 which filters any coffee passing through the openings 26 into chamber 19 and thence to the stem 12.

A disc valve 28 receivable on the upper rim of the ring 24 is provided with spaced tapped bores 29 to removably receive the threaded ends 30 of the rods 31 which are slidably mounted in the vertical openings 32 in the portion 17. The rods 31 extending through the body and connecting to the valve 28 allow the valve to open or close at will, such movement, however, being limited by the inturned lower ends 33 of the rods, which engage the lower end of the portion 17.

A convoluted spring 34, secured at its ends to the lower rim of the portion 17, is inserted in the stem 12 of the bowl and retains the body in place in the bowl, as shown in Figures 1 and 3. Thus the valve can be left in the bowl permanently or removed for cleaning as desired.

When the water in the bottom 10 comes to a boil, it ascends through the stem 12 into the valve body 15, causing the valve 28 to rise upwardly to permit all the water to enter the bowl 11. When the coffee maker is removed from the heat, the valve 28 will close instantly upon the lowering of the pressure in the bottom 10. The valve seats firmly on the ring 24, closing the upper open end of the body tightly. The coffee will then drain into the bottom 10 through the openings 26 and filter unit 27, preventing any coffee grounds from entering the bottom 10. Thus a cleaner and clearer pot of coffee is provided than is usually obtainable in coffee makers that do not strain the coffee.

The process of draining off the coffee into the bottom can be regulated by the size of the openings 26, and the draining process is usually of less duration than that of conventional coffee makers in use at the present time.

The rods 31 balance and control the valve 28, allowing it to raise only high enough to let water in the bowl 11, or permit any excess pressure in the bottom to freely escape therefrom to prevent the exploding thereof. The rods 31 can be removed from the valve 28 as shown in Figure 9, but the valve is usually self-cleaning, and will not require extra cleaning over an extended period of time.

As stated, should the pressure in the bottom 10 exceed safety proportions, the valve 28 will always move upwardly to allow such excess pressure to escape.

It is believed that from the foregoing description, the operation and construction of the valve will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A valve of the type described for use with vacuum coffee makers having a bottom and an upper bowl, having a stem thereon, comprising a valve body having an upper portion receivable in said bowl, and a lower portion receivable in said stem, an annular slot in said body, openings in said body, transversely of said slot, a filter element in said slot, a valve on said body, means connected to said valve and slidably mounted in said body for limiting the movement of said valve, and means connected to the lower portion of said body for retaining said body in said bowl.

2. The invention as in claim 1, wherein the upper portion of said body is contoured to conform closely to the inner surface of said bowl.

3. The invention as in claim 1, wherein said body is provided with an upper chamber having an outwardly bevelled top edge and an inwardly bevelled lower edge, and an intermediate chamber communicating with said upper chamber and said lower portion, and having a horizontal shoulder formed at its lower edge or point of communication with said lower portion.

4. A filter unit for a coffee maker of the kind having upper and lower bowls and a spout establishing communication between the bowls, said unit comprising a hollow body having open upper and lower ends and a conical enlargement, said body being adapted to be arranged in the bottom of the upper bowl with its lower and upper ends communicating respectively with the spout and upper bowl and with its conical portion seated on the bottom of the upper bowl, the upper end of the body constituting a valve seat, the upper end of the body having a groove and lateral openings communicating with the groove and with the upper bowl and the interior of the body, a filter in the groove, a gravity seating valve on said seat adapted to be unseated by and during the flow of the water upwardly from the lower to the upper bowl through the body and adapted to seat when said upward flow ceases so as to cause the infusion to flow through the filter during its downward passage from the upper to the lower bowl, means connecting the valve to the body to maintain the valve in longitudinal alignment with the body and to guide the valve onto its seat when flow from the lower to the upper bowl ceases, and means releasably securing the body within the upper bowl.

LEO W. VEZIE.

REFERENCES CITED

The following references are of record in the file of this patent:

UNITED STATES PATENTS

| Number | Name | Date |
|---|---|---|
| 938,605 | Nelson | Nov. 2, 1909 |
| 977,414 | Mathis | Nov. 29, 1910 |
| 2,005,954 | Petersen et al. | June 25, 1935 |
| 2,376,410 | Wolper | May 22, 1945 |
| 2,390,269 | Peterson | Dec. 4, 1945 |

FOREIGN PATENTS

| Number | Country | Date |
|---|---|---|
| 821,644 | France | Aug. 30, 1937 |